United States Patent [19]

Webb et al.

[11] 3,982,482

[45] Sept. 28, 1976

[54] FRUIT PEELING APPARATUS

[75] Inventors: John D. Webb, Clearwater; Alan F. Houghton, Dunedin, both of Fla.

[73] Assignee: Webb's Machine Design, Clearwater, Fla.

[22] Filed: Nov. 22, 1974

[21] Appl. No.: 526,331

[52] U.S. Cl. .................................. 99/491; 99/489; 99/589; 99/593; 99/595
[51] Int. Cl.² ............................................ A23N 7/00
[58] Field of Search ............ 99/489, 491, 540, 541, 99/542, 486, 588, 589, 590, 591, 592, 593, 594, 595; 83/368, 371

[56] References Cited
UNITED STATES PATENTS

| 260,236 | 6/1882 | Rakes | 99/541 |
|---|---|---|---|
| 2,699,191 | 1/1955 | DeBack et al. | 99/542 X |
| 3,211,201 | 10/1965 | Creed | 99/543 |
| 3,237,664 | 3/1966 | Macy et al. | 99/489 X |
| 3,753,397 | 8/1973 | Shrewsbury et al. | 99/491 |

Primary Examiner—Billy J. Wilhite
Assistant Examiner—James A. Niegowski
Attorney, Agent, or Firm—Cushman, Darby & Cushman

[57] ABSTRACT

An apparatus for automatically peeling fruit whereby a cutter blade is moved toward and away from the fruit as a function of the sensed impedance between the cutter blade and ground through the fruit so that substantially all of the peel is removed. In the preferred embodiment, a horizontal assembly presents a fruit to each of a plurality of fruit holders mounted on a vertical assembly so that each one of the presented fruit is impaled on a different spike of the vertical assembly. A plurality of cutter assemblies each mounting a cutter blade are moved toward and away from the fruit as it is rotated and moved upward to remove the peel. A control circuit includes a counter incremented by pulses from Hall Effect Switches which are energized by magnets mounted on the vertical and horizontal assemblies and controls movement of the assemblies to carry out a predetermined cycle.

63 Claims, 23 Drawing Figures

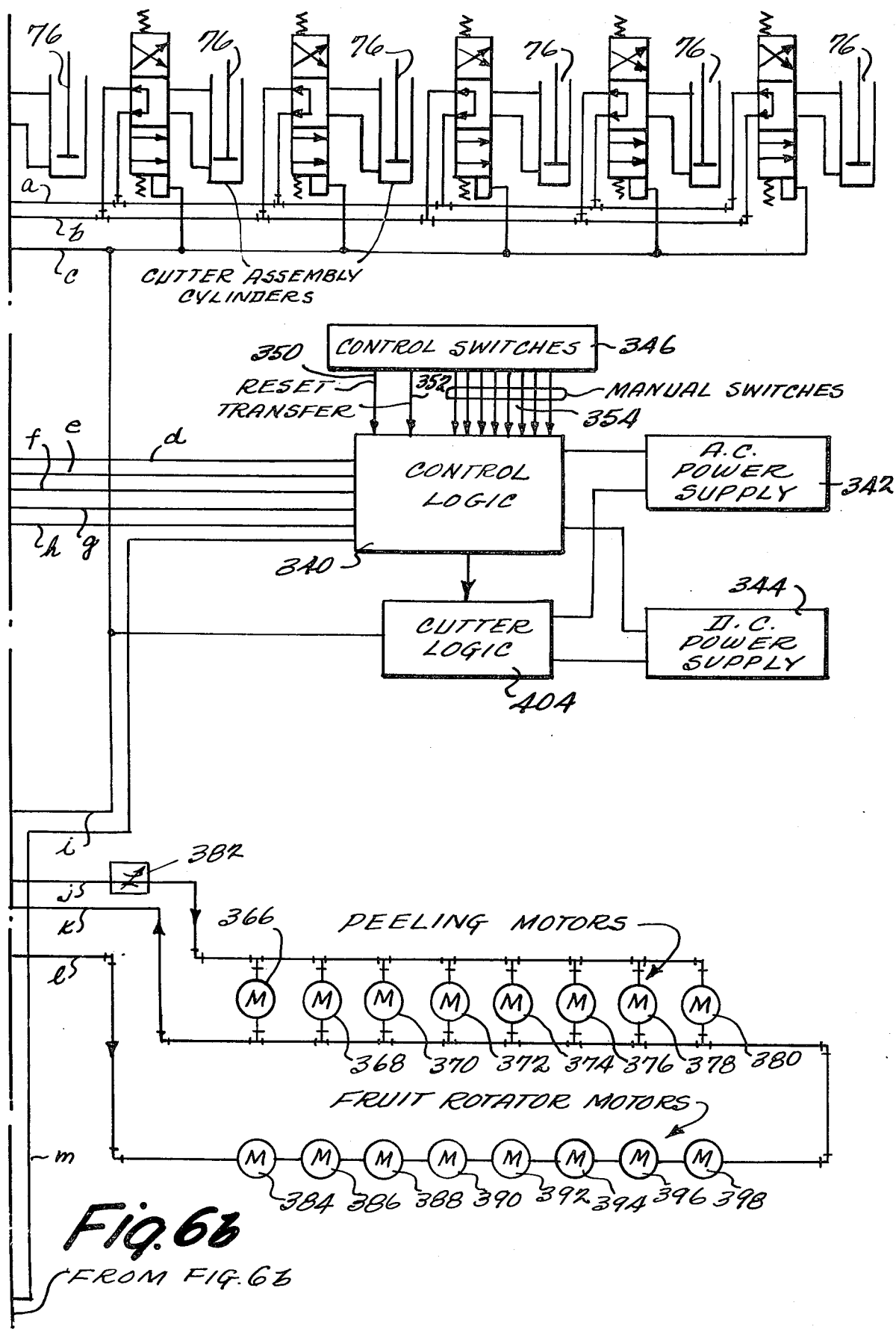

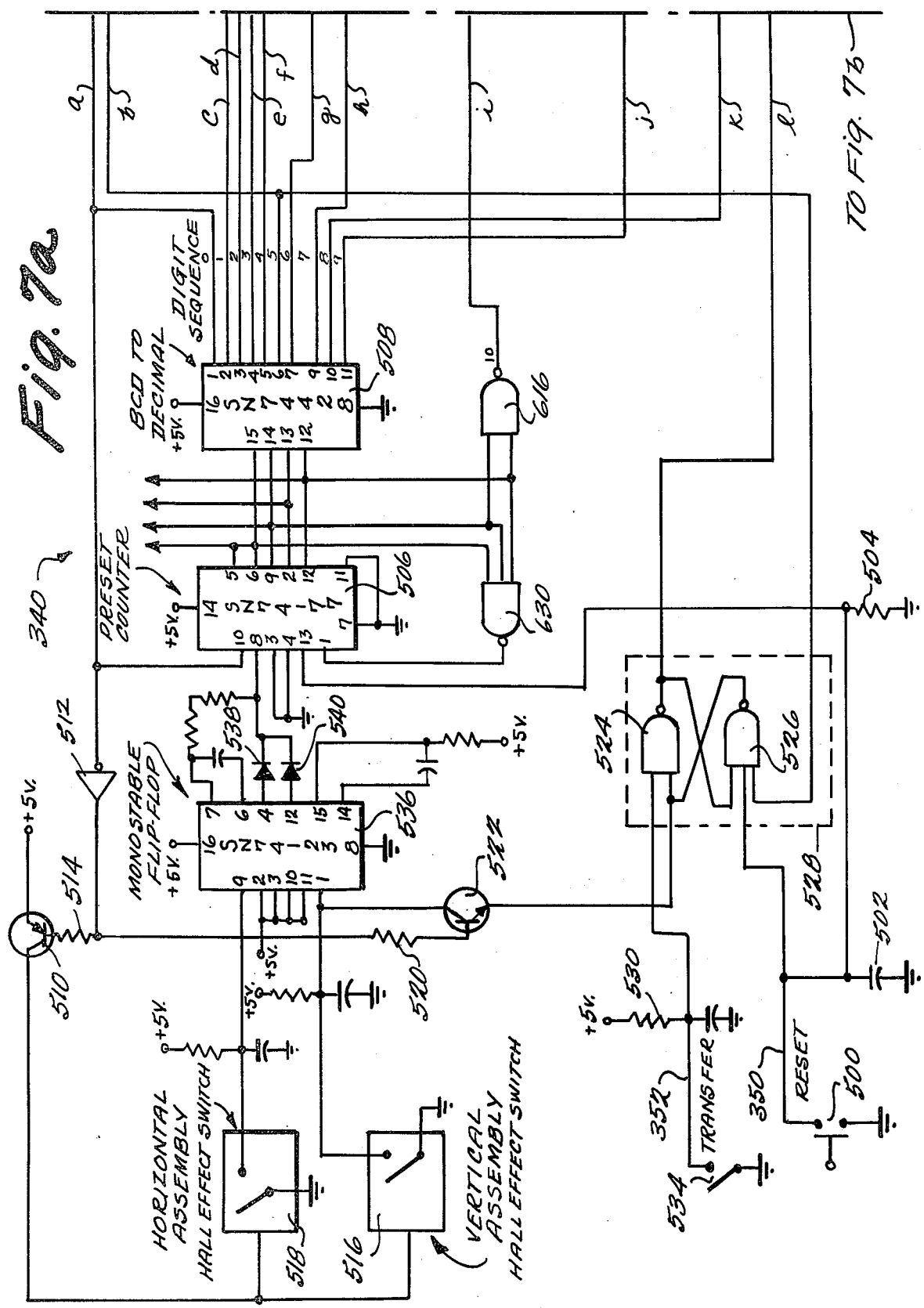

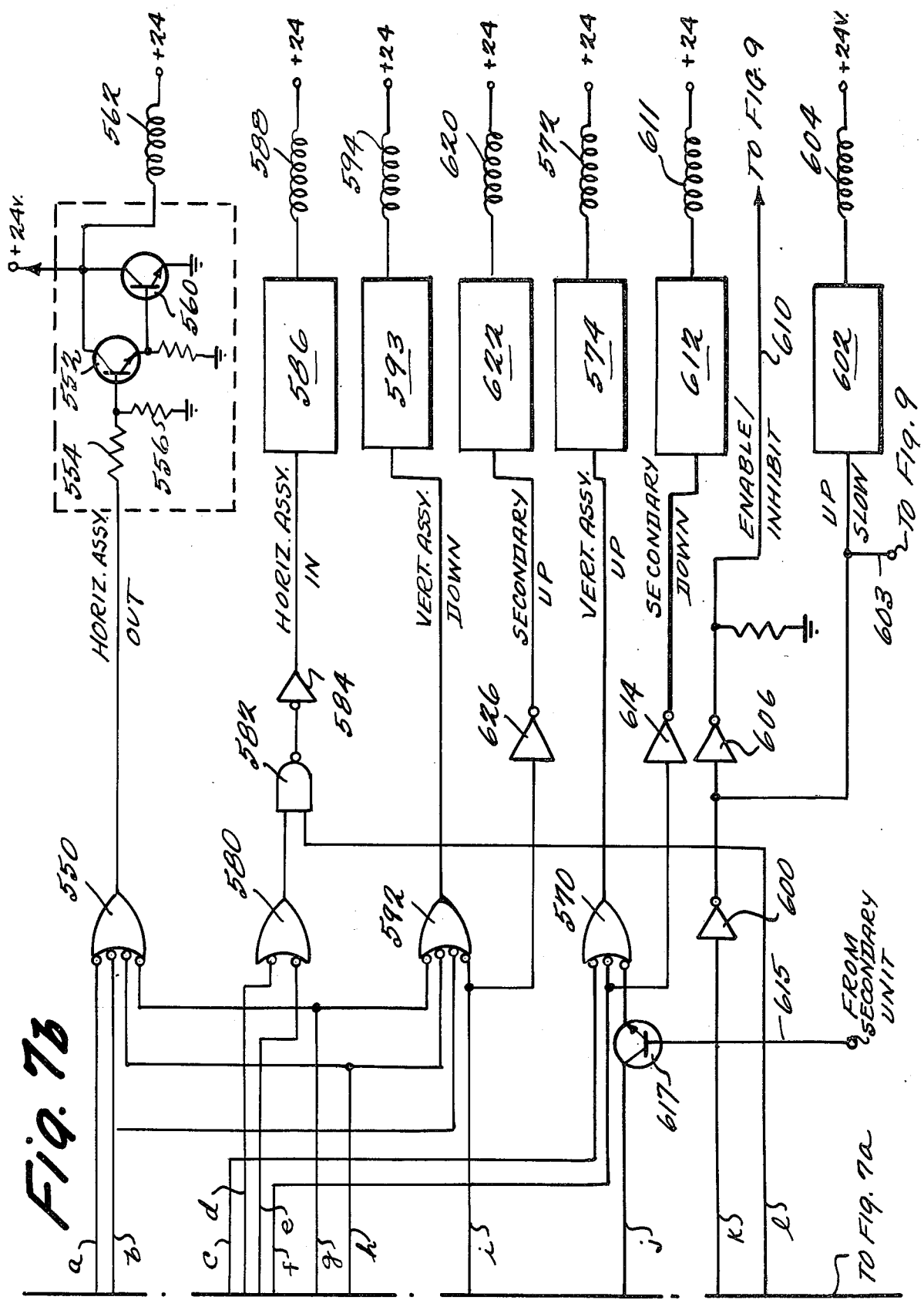

FRUIT PEELING APPARATUS

BRIEF DESCRIPTION OF THE PRIOR ART AND SUMMARY OF THE INVENTION

The invention relates to a unique apparatus and method for automatically removing peels from fruit and the like.

A commerical market exists for selling sectioned or sliced citrus fruit and the like. Two methods are currently employed to peel citrus fruit commercially prior to sectioning or slicing. One technique is to peel each of the fruit individually by hand. This operation is slow and expensive, but generally produces a more satisfactory product than the hot peel method described below. The peel and about 15 to 20 percent of the usable fruit are removed manually with knives. Average production is approximately 5 to 6 fruit per minute per person. The rising cost of labor and the undesirable nature of the work makes this method increasingly impractical.

A second technique, the hot peel method, uses a peeling machine and has been in common use for the last fifteen to twenty years. The peeler machine will provide satisfactory results only if the fresh fruit is wilted, which requires 5 to 8 days in a storage bin and results in considerable degradation of the fruit sections. The wilted fruit is carried on a roller conveyor through a steam tunnel to raise the fruit's internal temperature at a depth of roughly one-half inch to 130°–140°F. An operator next loads the hot fruit into the peeling machine cup and aligns the bud axis to a spot of light. Blade, metal fingers and heavy rubber rings cut and strip all of the flavito and most of the albedo. (The outer colored layer of the peel is called the flavito while the inner colorless layer is the albedo). The remaining albedo is chemically removed by dipping the fruit in a 190°F caustic soda solution for approximately 15 to 20 seconds. A water rinse then removes the caustic soda and a cold water bath at 28°F for 15 minutes readies the fruit for sectioning. Unfortunately the internal temperature at this point is still 110°, which degrades the sections still further. While this technique is the cheapest and the fastest available prior to this invention, the product is considerably degraded due to heating and immersion in the caustic solution and has a very limited appeal in the market place. For that reason the market for this type of product has not grown over the past few decades.

The present invention relates to a method and apparatus which can automatically remove all of the albedo and flavito without rupturing or removing any of the inner fruit sections and which performs that function quickly without the need for extensive manual steps or without in any way raising the temperature of the fruit or applying chemicals of any sort. The product which is produced is at least as satisfactory for commercial sale as the fruit sections produced by the most careful hand peeling, and in fact is better because in removing all of the unwanted portions, very few juice cell sacks are ruptured or cut, thus preventing bacteria from contaminating the edible fruit.

This is accomplished as discussed in detail below by a machine which is comprised of basically three assemblies — a horizontal assembly, a vertical assembly and a cutting blade assembly. The vertical assembly essentially comprises a horizontal beam on which is supported a plurality of fruit rotator hydraulic motors in a row. Eight hydraulic motors have been found to be a reasonable number. Each motor rotates a spike which is provided with tines and which is preferably mounted directly on the motor shaft. Each of these spikes impales a fruit for peeling and holds it while the peel is removed.

The horizontal assembly comprises a number of fruit holders which secure and align the fruit on the spikes before peeling and which serve to convey the fruit for each of the spikes from a load position in which fruit are manually or automatically loaded to a transfer position where it can be transferred to the vertical assembly spikes.

One cutting blade assembly is provided for each vertical assembly. Each cutting blade assembly includes a small rotator hydraulic motor that rotates a cutting blade which is mounted directly on the shaft of the hydraulic motor for movement toward and away from the fruit impaled on the vertical assembly spike.

All of the mechanical manipulations relating to removal of the peel are automatically carried out under the control of a control logic circuitry and a cutter logic circuitry which establishes a peeling cycle and causes the various hydraulic motors to be rotated and the assemblies moved back and forth and up and down to carry out the desired functions. The cutting blade is connected to the cutter logic circuitry and particularly to a high frequency oscillator with the spike being grounded so that the impedance between the cutting blade and ground through the fruit alters an applied high frequency oscillation signal to indicate clearly when the cutting blade has completely removed the peel and has penetrated exactly to the fruit sections. Accordingly, by controlling the movement of each individual cutting assembly toward and away from the fruit it is peeling as a function of the electrical signal derived from that fruit alone, effectively all the fruit's inedible portion can be removed without damaging the edible sections or portions of the fruit.

Operation of the device and the initiation of the method begins when the operator loads the unpeeled fruit into the horizontal assembly, which then automatically carries it to the transfer position. The vertical assembly moves up and the spikes thereon each pierce a fruit with the tines at the base of the spike moving into the bottom of the fruit to hold it securely during peeling. The spike motors are not rotating at this time.

After this operation, the horizontal assembly returns to the load position and the vertical assembly descends. As it approaches the limit of its downward travel, the motor and spike tilt toward the cutting assembly. When the vertical assembly has reached its bottom limit, it starts back up slowly and the spindle motors begin to rotate. The cutting blade assemblies then move into position above and at the center of the rotating fruit. As the vertical assembly slowly rises and tilts away from the cutter assembly, the fruit is peeled and thereafter the motors stop rotating, the cutting blade assembly recedes, and the vertical assembly rises quickly to transfer the peeled fruit onto the tines of a conventional machine that will perform a secondary function such as sectionalize it. The vertical assembly then descends to a park position to await the arrival of the horizontal assembly with the next load of unpeeled fruit. This cycle is repeatedly carried out to quickly, simply, and effectively peel fruit, particularly oranges and grapefruit.

Like any rotating mass the portions of the peel closest to the axis of rotation are moving slower than those further away. The cutter assembly having substantial mass and inertia is limited in how fast it can respond to signals from the control circuit to reverse its direction of movement. If the peel portion being removed is moving too quickly, then the cutter assembly cannot respond quickly enough to satisfactorily follow the contour of the edible fruit interior. On the other hand, the cutter blade initially cutting away peel near the axis of rotation can follow the contour at a much higher speed. It is, of course, desirable to peel as rapidly as possible.

This problem is resolved by rapidly rotating the fruit until the peel portions near the axis of rotation have been removed and thereafter slowing rotation to remove the rest of the peel. In this fashion all of the peel is satisfactorily removed in minimum time. This is accomplished by opening a bypass hydraulic valve during the first part of rotation. The first penetration of the cutter blade is sensed by the cutter logic circuitry, which after a given delay, closes the bypass valve.

In the specific embodiment of the invention described below, the appropriate points for changing movement of the three assemblies are determined by signals derived from Hall Effect Switches which are mounted inside the cabinet of the unit on the back panel. Three magnets are mounted on the vertical assembly, one at each end and one near the center. When the magnets move in the vicinity of a switch as the vertical assembly moves, the switch is activated by the magnetic lines of force to produce a signal which is used by the control logic to carry out the cycle described briefly above. Similarly the horizontal assembly carries two magnets on its frame with a separate Hall Effect Switch provided inside the cabinet to be controlled thereby.

Many other objects and purposes of the invention will be clear from the following detailed description of the drawings.

BRIEF DESCRIPTION OF THE DRAWINGS

FIGS. 6a and 6b join to show a schematic block diagram of the hydraulic and electrical circuitry;

FIGS. 7a and 7b join to show a detailed schematic of the control logic circuitry;

DETAILED DESCRIPTION OF THE DRAWINGS

Figure 1:
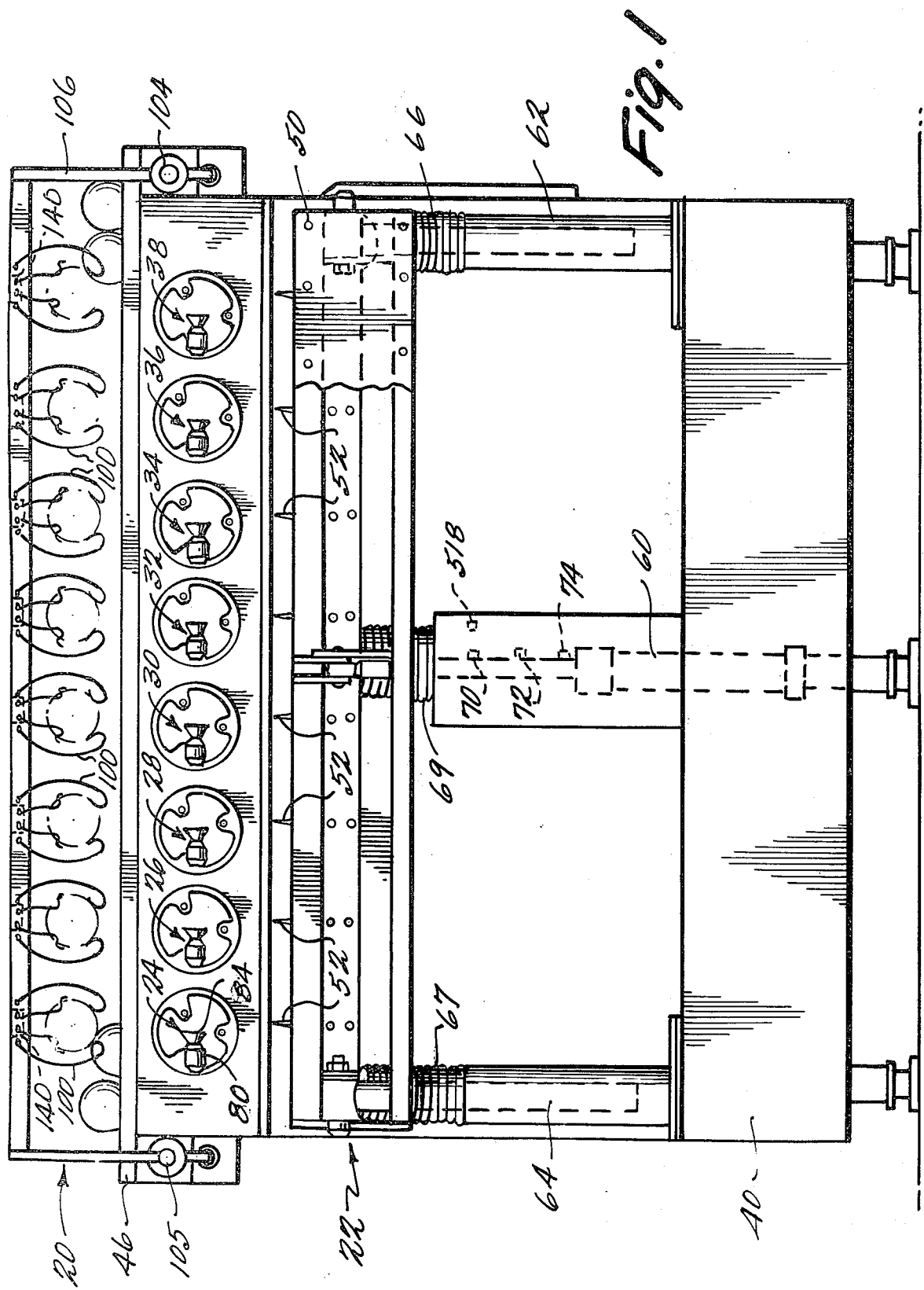
FIG. 1 shows a front elevation view of one embodiment of this invention.
Figure 2:
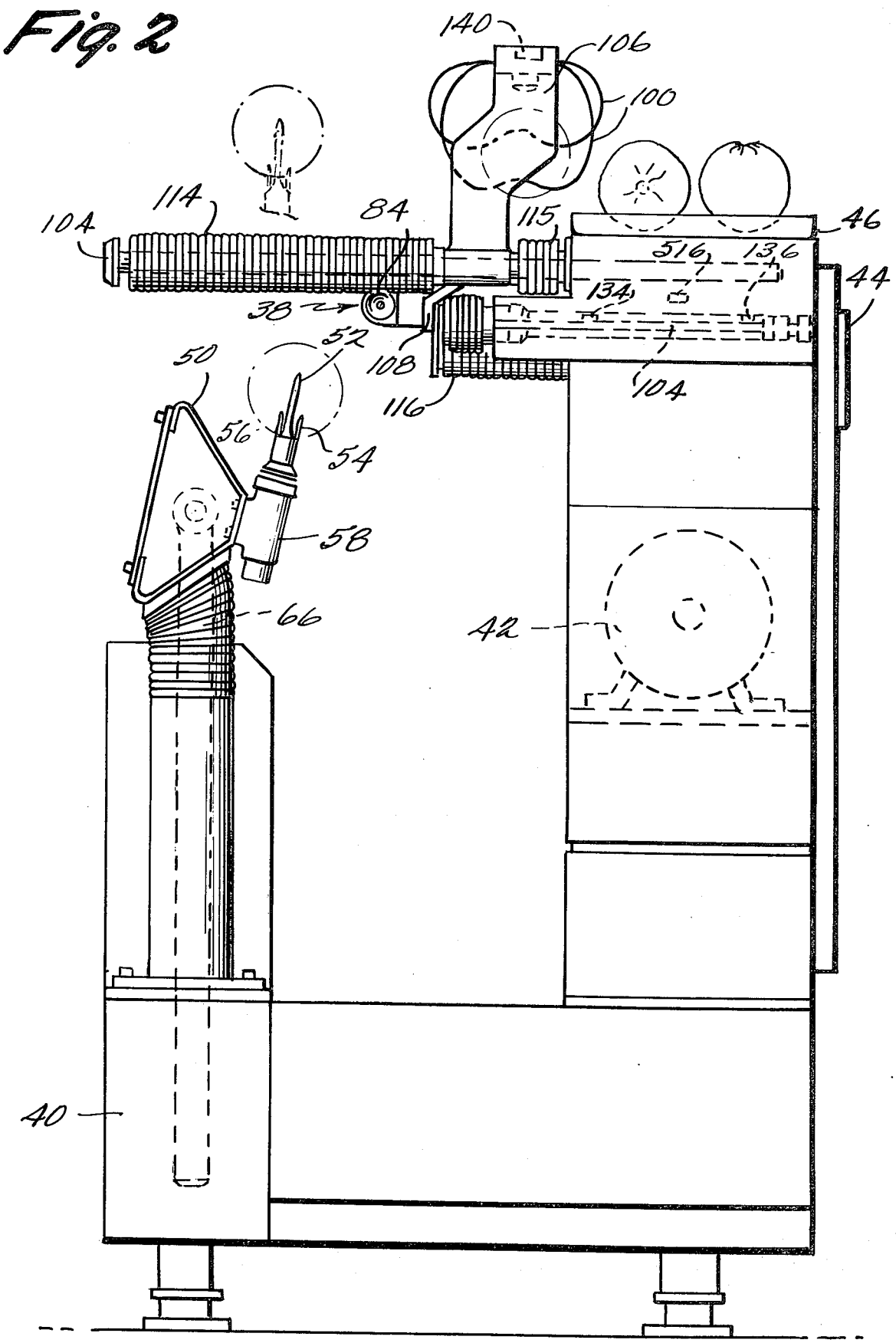
FIG. 2 shows a side elevation view of the embodiment of FIG. 1.

Reference is now made to FIGS. 1 and 2 which show respectively front and side elevational views of one embodiment of the unique apparatus of this invention. As indicated briefly above, the apparatus includes three basic assemblies — horizontal assembly 20, vertical assembly 22 and a plurality of cutter assemblies 24, 26, 28, 30, 32, 34, 36, and 38. All of these assemblies are mounted for movement with respect to a frame generally indicated as 40. A conventional hydraulic pump 42 together with conventional hydraulic lines connecting to the various hydraulic cylinders which effect movement of the various cylinders described below, are disposed within the frame 40 as is convenient. The electronic circuitry which is detailed below is also conveniently disposed within frame 40 with a control panel 44 provided at a location convenient to the operator of the machine who normally stands behind the fruit loading tray 46 to manually load horizontal assembly 20.

As can be best seen in FIG. 2, the vertical assembly includes a vertical mounting bar 50 which mounts a number of fruit holders equal to the number of cutting assemblies; in this embodiment eight cutting assemblies are provided for simultaneously peeling eight fruits. Any number of these assemblies can be provided and in fact the apparatus will satisfactorily function with only a single cutting assembly and fruit holder. Each fruit holder comprises a spike 52 which is electrically grounded and flanked by a pair of tines 54 and 56. As can be seen in FIG. 2 and as is apparent from the discussion below, spike 52 penetrates into the fruit along the bud axis while the tines 54 and 56 prevent the fruit from slipping while it is being rotated and peeled. A conventional hydraulic motor 58 is directly coupled to spike 52 and tines 54 and 56 for rotating spike 52 and particularly any fruit mounted thereon under the control of circuitry described in detail below and as part of the overall cycle.

Upward and downward movements of the vertical assembly 22 are caused by a conventional hydraulic cylinder 60 which is mounted in roughly the middle of the unit as seen in FIG. 1. Posts 62 and 64 which flank the hydraulic cylinder 60 provide additional support for vertical assembly 22 as it moves up and down. Flexible boots 66 and 67 are preferably mounted as illustrated to posts 62 and 64 in FIG. 1 to prevent oil from the peeled fruit from entering into the interior of the machine, and a similar boot 69 seals hydraulic cylinder 60.

As will be more apparent from the discussion below, the movement of the various assemblies is controlled by circuitry which follows a predetermined cycle. Changes of direction are carried out when a magnet mounted on either the horizontal or vertical assembly encounters a Hall Effect Switch which is fixedly mounted with respect to the respective assemblies. In FIG. 1, magnets 70, 72 and 74 are indicated as mounted for movement in any fashion which is convenient with the vertical assembly past fixed Hall Effect Switch 518 (FIG. 7).

Figure 4:
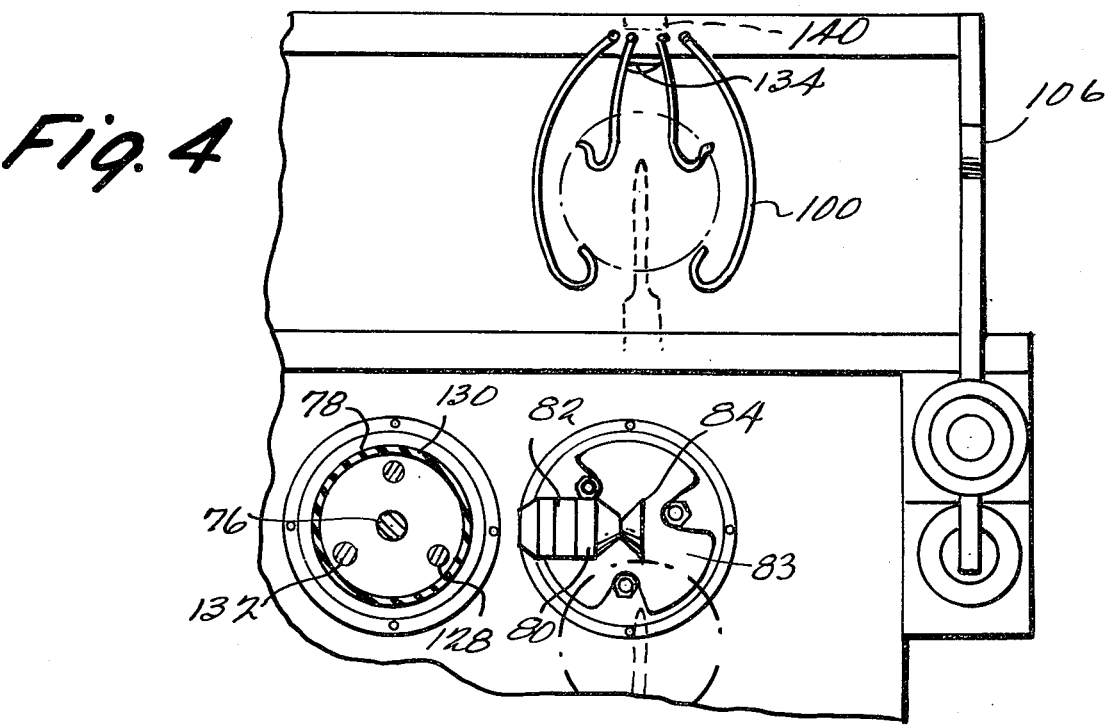
FIG. 4 shows a plan view of details of the horizontal assembly and a partially cut away view of a cutter assembly.

As can be best seen in FIGS. 2 and 4, cutter assembly 38, which is preferably identical to all of the other cutter assemblies, includes a conventional hydraulic cylinder 76 which moves the assembly toward and away from an impaled fruit such as the fruit indicated in dashed lines in FIG. 2 as impaled on spike 52. A flexible boot 78 surrounds the hydraulic cylinder 76 and like boots provided for the other cutter assemblies serve to keep oil and other material generated by the peeling out of the hydraulic cylinders. A small hydraulic motor 80 is mounted by a strap 82 onto plate 83 which is moved by the hydraulic piston 78. A conical cutting blade 84, best seen in FIG. 4, is directly mounted on hydraulic motor 80 for rotation. Cutter blade 84 is positioned with respect to the cutter assembly 38 so that when the fruit is presented for peeling to cutter blade 84 while extending in the position indicated by dashed lines, rotating cutting blade 84 will first encounter the top of the fruit so that all of the peel will be effectively removed during the peeling operation.

Figure 3:
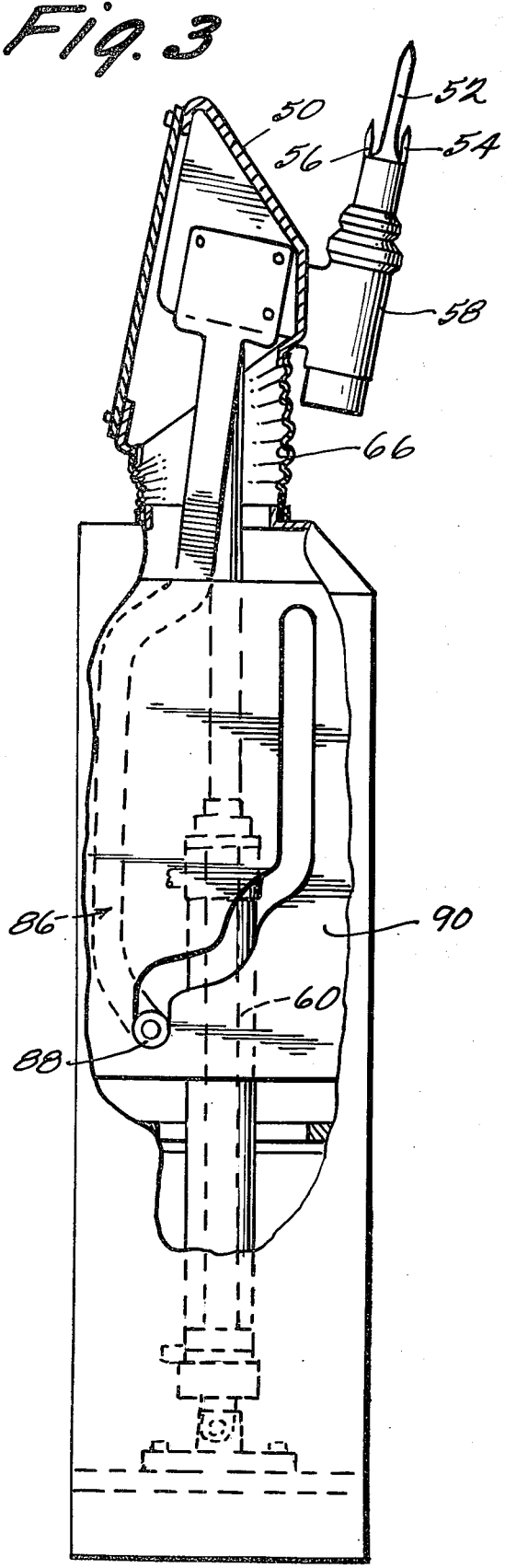
FIG. 3 shows a vertical section view along the lines 3—3 of FIG. 1.
Figure 10:
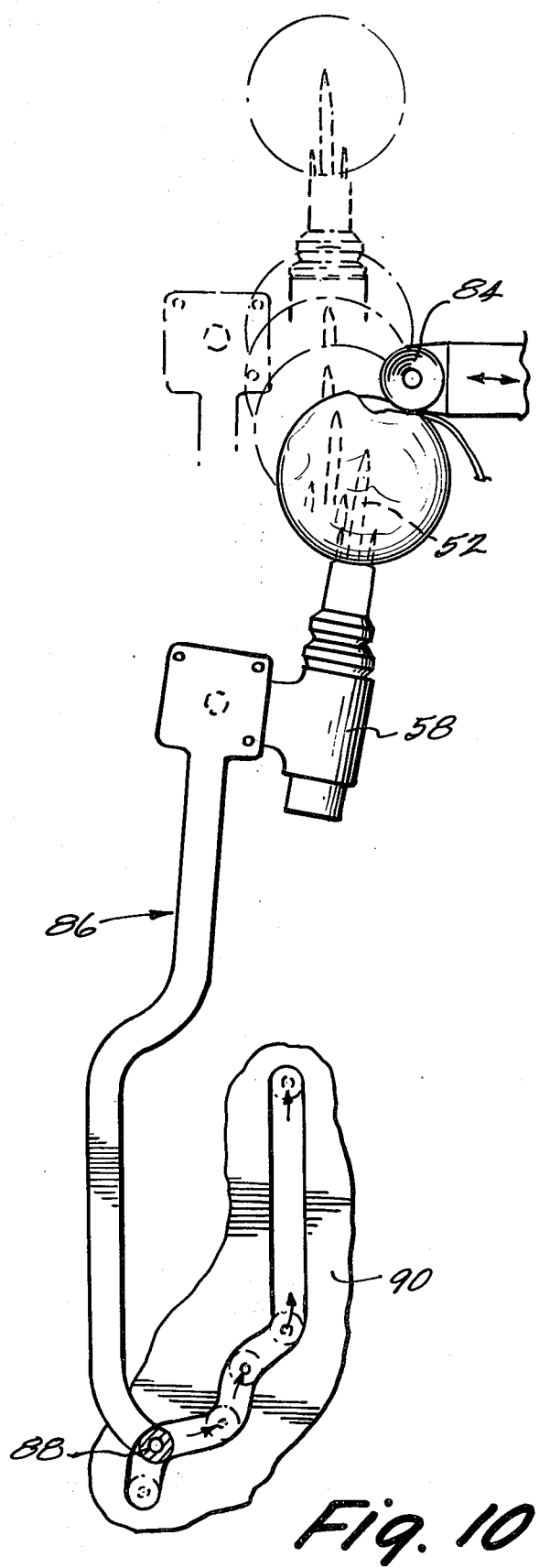
FIG. 10 shows a diagrammatic view of a fruit being peeled.

Each of the cutter assemblies operates individually as the impedance between the cutter blade and the grounded spike 52 through the fruit it is peeling is detected and the movements of cutter blade 84 toward and away from the fruit adjusted accordingly so that all of the peel is effectively removed without removing the interior edible portion of the fruit. Since the cutter assembly 38 moves in a horizontal direction, it is necessary for the vertical assembly also to have a horizontal component of motion so that the top of the fruit can be effectively peeled. This component of motion is supplied by a cam mechanism which can be best seen in FIG. 3. Referring to that Figure, it can be seen that mounting bar 50 is directly connected by linkage 86 to cam follower 88 which follows the contour of a plate 90 which causes the fruit to be tilted away from the cutting assembly as it moves vertically upward.

Figure 5:
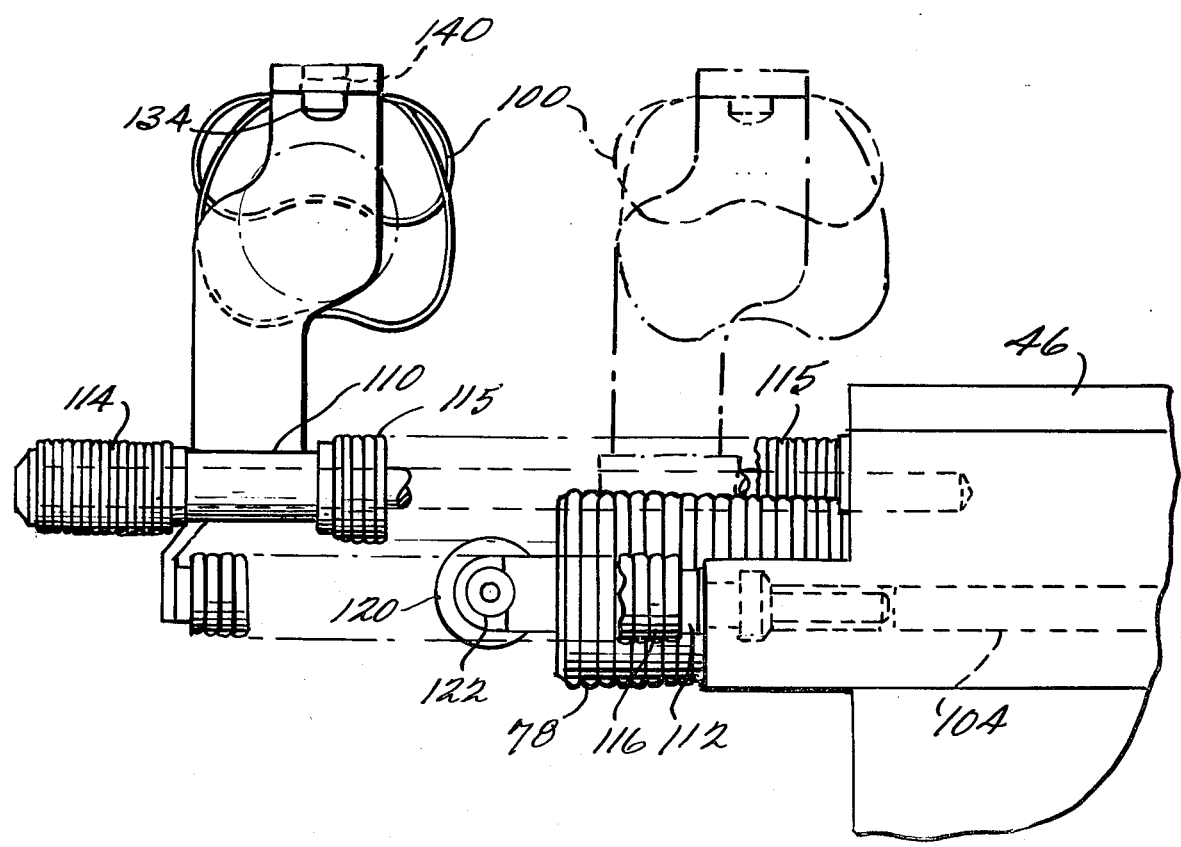
FIG. 5 shows a side view of the details of FIG. 4.

Reference is now made to FIGS. 4 and 5 which illustrate further details of the invention of this application. As can be also seen in FIG. 1, horizontal assembly 20 includes eight fruit grippers 100 which are each comprised of a pair of stainless steel spring wires which hold the fruit in position until it is impaled by one of the spikes 52 of the fruit holders of vertical assembly 22. The operator of the machine manually loads the fruit, which are preferably kept stored in tray 46, into the fruit holders 100. Alternatively, the fruit holders can be automatically loaded by any suitable equipment.

Horizontal assembly 20 moves horizontally toward and away from the fruit as described in greater detail below. Movement of the horizontal assembly is effected by conventional hydraulic cylinders 104 and 105 which can be best seen in FIGS. 1, 2 and 5 and which cause movement of the bracket 106 on which the fruit holders 100 are directly mounted. Ball bushing shafts 110 and 112 guide movement of the bracket 106 and are connected by member 108. These shafts are covered and protected by boot covers 114, 115 and 116. Magnets 134 and 136 are mounted for movement past Hall Effect switch 516 (FIG. 7) for producing pulses which are utilized to carry out the cycle as described below.

The horizontal assembly also includes a plurality of lamps 140 which are suitably connected to a power source and which are used by the person loading the holders 100 to align the bud axis directly with the lamps so that axis of rotation of the fruit after it has been impaled on the spikes 52 of the vertical fruit holders essentially coincides with the bud axis. This position results in most efficient and effective removal of the peel.

Figure 6A:
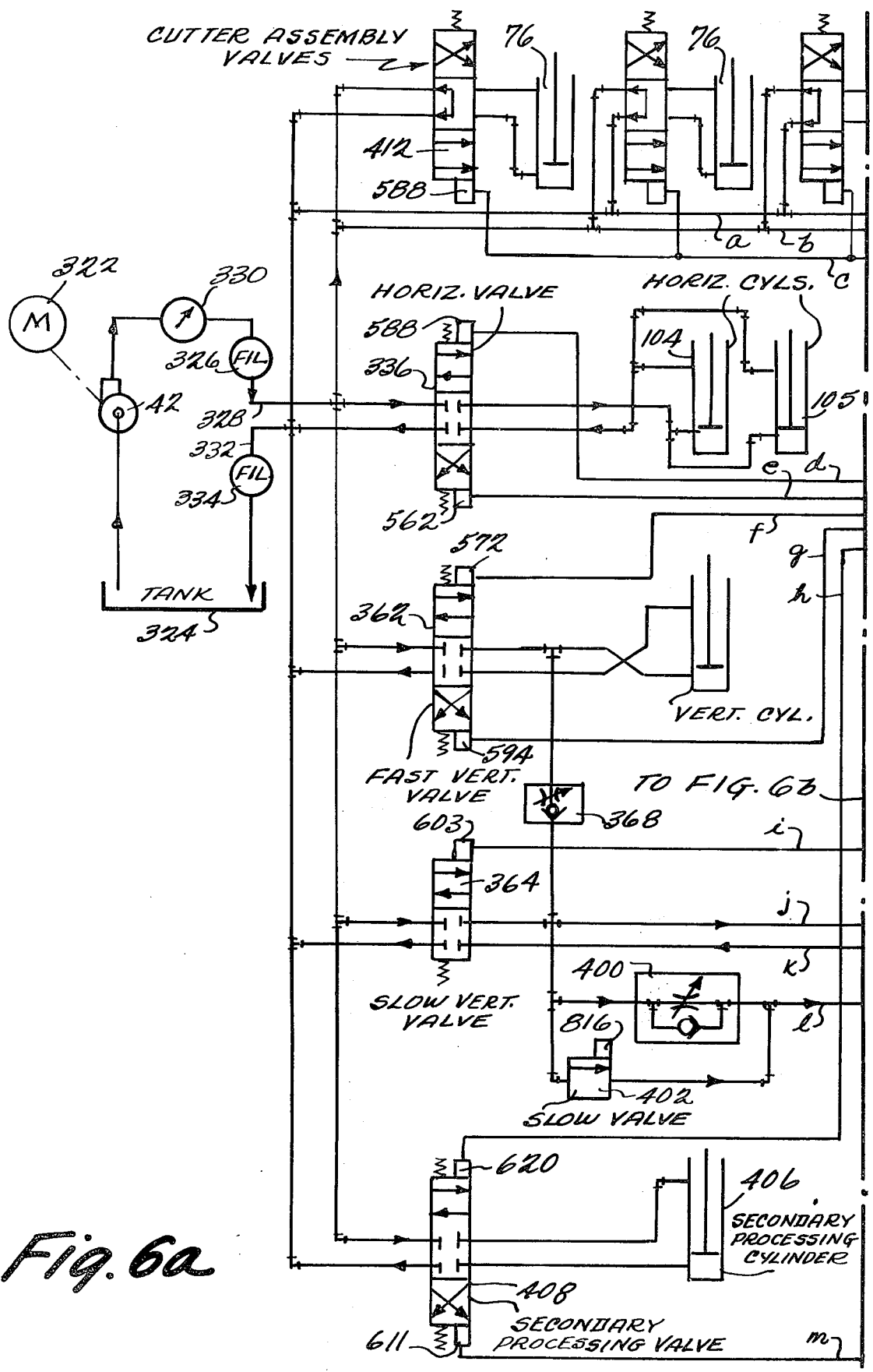
Figure 8A:
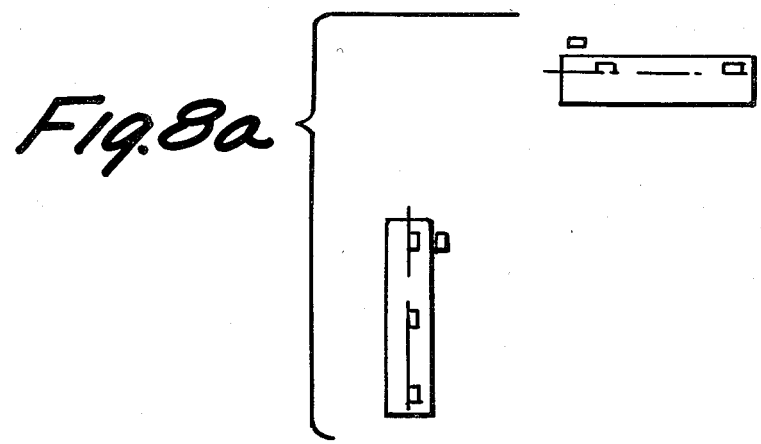
FIGS. 8a to 8k show a series of schematic views of the horizontal and vertical assemblies illustrating the relationship between Hall Effect Switches and magnets at each of the cycle positions.
Figure 8B:
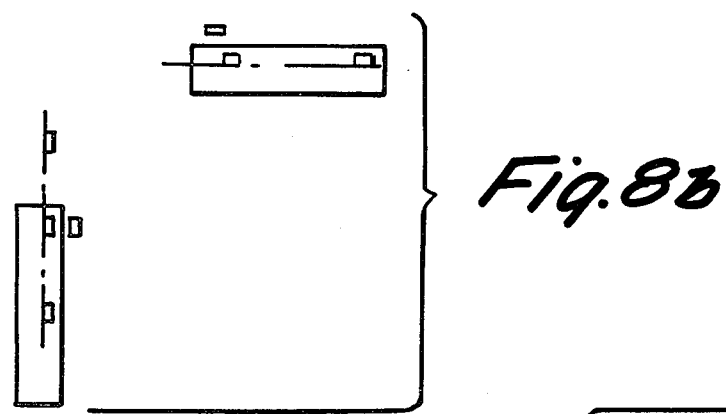
Figure 8C:
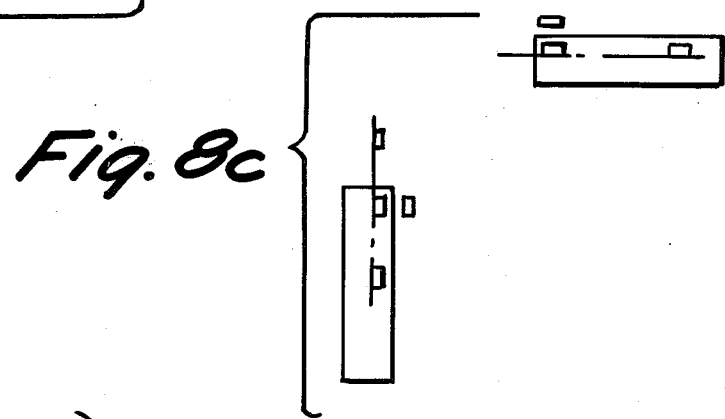
Figure 8D:
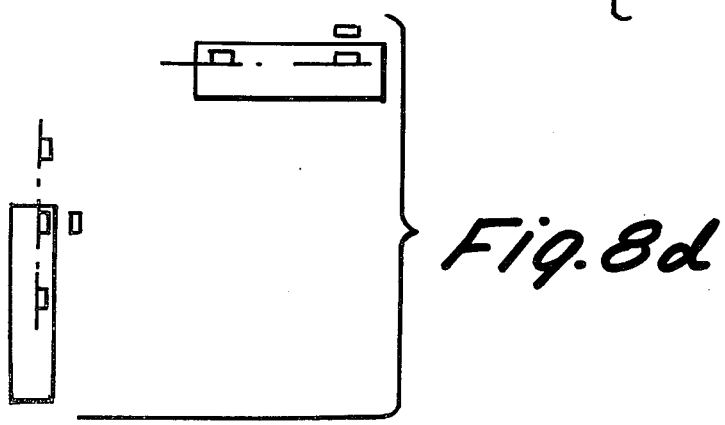
Figure 8E:
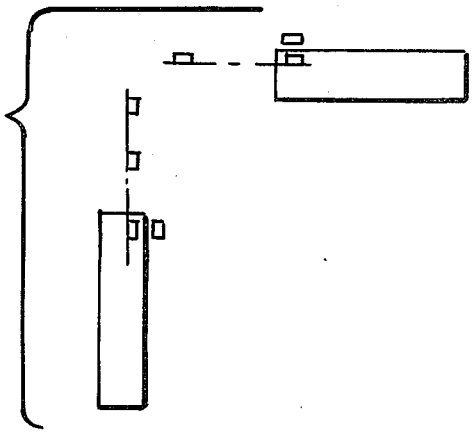
Figure 8F:
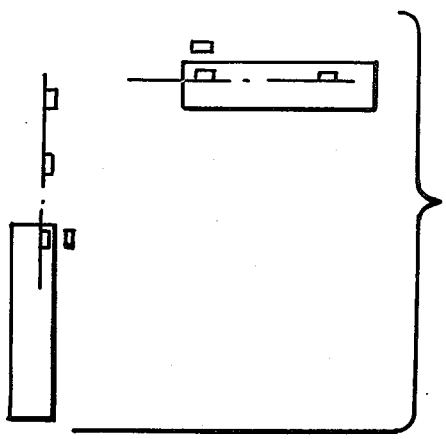
Figure 8G:
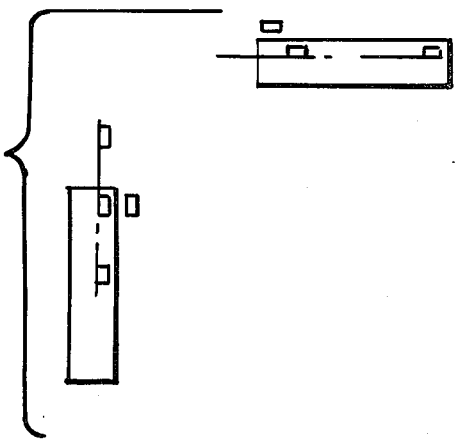
Figure 8H:
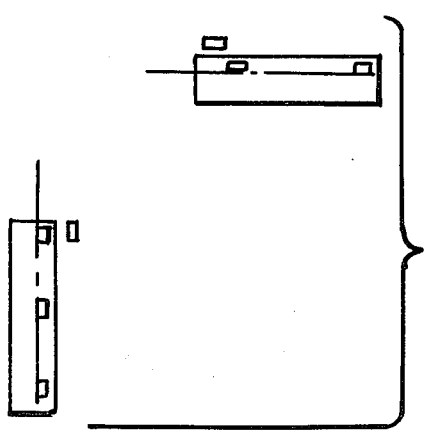
Figure 8I:
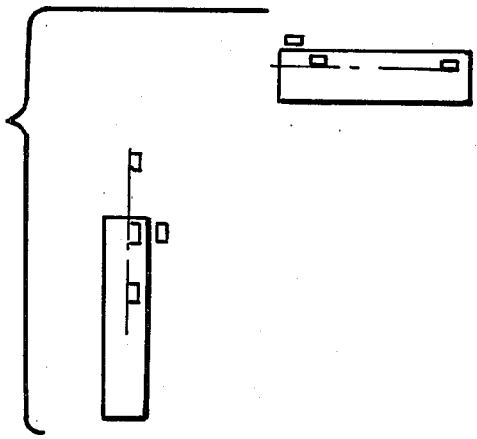
Figure 8J:
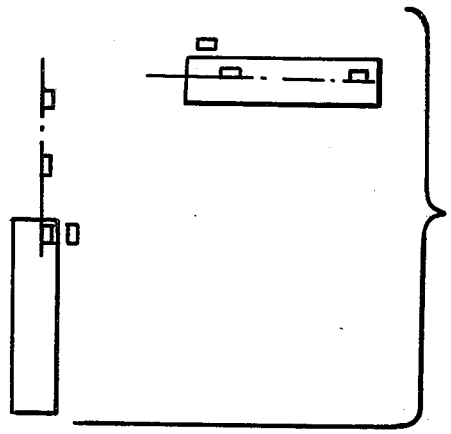
Figure 8K:
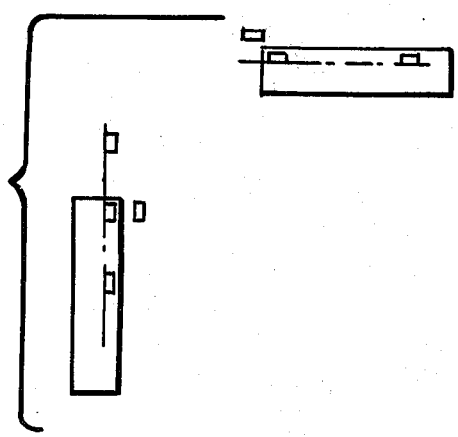

The following portions of this specification describe in detail how the vertical, horizontal and cutter assemblies are moved and operated in a cycle established by signals produced by circuitry 340 and 404 (FIG. 6). Briefly, the cycle begins with the horizontal assembly 20 moved outward to a load position where the individual holders 100 can be manually or automatically loaded with fruit and the vertical assembly down as shown in FIG. 1. Following manual operation of the transfer switch 534, the horizontal assembly 20 moves inward to a transfer position in which each holder 100 is immediately above a spike of the vertical assembly 22. The vertical assembly 22 then moves up until each spike has impaled a fruit and then returns with its impaled fruit to a position below the corresponding cutter assembly. The horizontal assembly now moves outward to the load position where the operator places new fruit in holders 100.

Next, the vertical assembly 22 moves slowly upward while rotating and each cutter assembly cylinder 76 is actuated so that each of the cutter assemblies moves toward a fruit while its cutter blade rotates. Each cutter blade first encounters the fruit at the top, closely adjacent to or intersecting the axis of rotation of the fruit. The fruit continues moving upward and tilts away from the engaged cutter assembly as it rises. The cutter blade meanwhile alternately oscillates back and forth, advancing until penetration of the edible fruit interior is detected and then retreating until it is no longer detected so as to follow a helical path and remove the peel as a helix. The speed of rotation of each of the fruit is slowed after the first portions of the peel closest to the axis of rotation have been removed.

After the peel is removed, each of the peeled fruit moves upward at a faster rate until it is in the transfer position in which the fruit can be removed automatically or manually, by any suitable machine such as a slicer, sectionizer or the like. The vertical assembly next moves downward and the above cycle is repeated.

Reference is now made to FIG. 6 which shows a schematic view of the electrical and hydraulic circuitry which controls movement of the horizontal, vertical and cutter assemblies. A conventional pump 42 (FIG. 2) operated by a conventional electric motor 322 pumps hydraulic fluid of any conventional type from a tank 324 through filter 326 to line 328. Gauge 330 provides an indication of the hydraulic pressure. Hydraulic fluid returns to tank 324 from line 332 via conventional filter 334.

Lines 328 and 332 are connected via horizontal valve 336, which is controlled by solenoid coils 562 and 588 (FIG. 7), to horizontal cylinders 104 and 105 which, as described above, are connected at opposite ends of horizontal assembly 20 for effecting movement of that horizontal assembly inward and outward — toward and away from vertical assembly 22. Valve 336 can be shifted by the control logic circuitry 340 of FIG. 7 which applies an appropriate electrical signal, into either of two positions, one of the positions causing cylinders 104 and 105 and horizontal assembly 20 to move in one direction and the other position causing cylinders 104 and 105 to move in the opposite direction.

Control logic circuitry 340 is connected to a conventional A.C. power source 342 as well as to a conventional D.C. power source 344 which supply the energy and electrical signals for effecting the desired control functions. Further a plurality of control switches 346 are connected to control logic circuitry 340. These switches 346 include a reset switch 500 (FIG. 7) which provides a reset signal to the control logic circuitry 340 on line 350 as described below. Similarly, switches 346 include a transfer switch 534 (FIG. 7) which is manually operated to provide a transfer signal on line 352 to cause transfer of the fruit loaded on the horizontal assembly 20 onto the spikes of the vertical assembly 22. Even further, switches 346 preferably include a plurality of manual control switches which set the control logic in any of the cycle positions as illustrated in Table 1 and described in detail below for the purpose of diagnosing problems and for manual testing. These manual control switches, the connections of which are indicated as 354, are not described in further detail.

Lines 328 and 332 are further connected to the vertical cylinder 60 via vertical valve 362 which is controlled by solenoid coils 572 and 594 (FIG. 7) and which cause the hydraulic fluid in tank 324 to be applied to vertical cylinder 60 to cause that vertical cylinder to move upward and downward at a fast rate. If required, more than one vertical cylinder can be employed.

As will be apparent from the detailed discussion of the cycle carried out by this unique machine as described below, during peeling, vertical cylinder 60 moves upward at a rate which is slower than the rate provided by operation of valve 362. This is accomplished by a second vertical valve — slow vertical valve 364 — which is connected to vertical cylinder 60 via check valve 368 which controls the rate of flow so that the flow rate into vertical cylinder 60 while vertical valve 364 is activated, is controlled to cause vertical cylinder 60 to move upward at a rate which is slower than that at which it moves upward, while fast valve 362 is activated. Valves 362 and 364 are not operated at the same time.

While slow vertical valve 364 is activated, and the fruit moves upward and is peeled, hydraulic fluid is applied to each of the eight hydraulic peeling motors 366, 368, 370, 372, 374, 376, 378 and 380 (FIG. 6b), which are each mounted in one of the hydraulically operated cutter assemblies and each of which is directly coupled to a cutter blade which is rotated by the respective peeling motors. Referring to FIG. 4, hydraulic peeling motor 80 rotates conical cutting blade 84. Check valve 382 is connected between vertical valve 364 and the respective peeling motors.

A plurality of fruit rotating motors 384, 386, 388, 390, 392, 394, 396 and 398 are each directly coupled to rotate a spike 52 on which is impaled a fruit to be peeled and are also connected between lines 328 and 332 via check valve 400 and valve 364. Slow valve 402 is connected in parallel with check valve 400 and is connected to the cutter logic circuitry 404. Cutter logic 404 individually controls each of the cutter assemblies. When slow valve 402 is activated by coil 816 (FIG. 9b), increased hydraulic fluid flows through the fruit rotating motors which accordingly operate at a faster rate.

As discussed briefly above, the cutter assembly can satisfactorily remove peel from a fruit which is rotating at a relatively fast speed during the initial part of the peeling operation when peel is being removed from the upper portions of the fruit which are not moving as fast as those portions furthest from the axis of rotation. By operation of the slow valve 402 after that initial period, the fruit can be peeled as quickly as possible while still producing satisfactory results, particularly in removing peel from those portions of the fruit furthest from the axis of rotation. As will be discussed further below in conjunction with the discussion of the cutter logic circuitry 404, detailed in FIG. 9, slow valve 402 is deactivated by cutter logic 404 a predetermined time after the first penetration into the edible portion of the fruit and accordingly the first reversal of direction of any one of the cutter assemblies occurs.

Hydraulic cylinder 406 is associated with a secondary process unit such as a conventional sectionalizer, slicer, or other structure. This structure is not illustrated in detail in this application. The cylinder 406 may operate to simply cause removal of the peeled fruit from vertical assembly 22 following the peeling operation. Secondary processing cylinder 406 is controlled by solonoid coils 611 and 620 (FIG. 7) of valve 408 which is in turn operated by the control logic circuit 340 as discussed in greater detail below.

In addition, each of the cutter assembly hydraulic cylinders 76, one of which is illustrated in detail in FIG. 4, is connected to hydraulic lines 328 and 332 by a cutter assembly valve, for example valve 412 in FIG. 6. Valve 412 in its normal illustrated position includes a return path for the hydraulic fluid. When valve 412 is shifted in one direction by an electrical signal provided by cutter logic 404 to coil 700 (FIG. 9b), fluid flows in a first direction which causes the cutter assembly cylinder 76 to move the cutter assembly toward the fruit. When the electrical signal from cutter logic 404, as discussed in greater detail below, shifts the valve 412 in the oppposite direction, fluid flows through hydraulic cylinder 76 to cause that assembly to move in the opposite direction away from the fruit. Accordingly, the cutter assembly direction is alternatively reversed as the cutting blade follows the contour of the fruit to be peeled, effectively and completely removing all of the peel without damaging the interior edible portions of the fruit.

Reference is now made to FIG. 7 which illustrates one embodiment of the unique control logic circuitry 340 for controlling operation of the three mechanical assemblies described above. FIG. 7 is split into parts 7a and 7b with the interconnections indicated by lower case letters. When the power is turned on, operation of the circuitry is initiated by uncharged capacitor 502 which applies ground to gate 526. NAND gate 524 together with gate 526 form transfer flip-flop 528. Since the other input to NAND gate 524 at this time is a positive input applied via resistor 530, gate 524 provides a low output voltage which is applied to one of the two inputs to gate 526. The results in a high output of gate 526 which maintains a stable output condition of transfer flip-flop 528. The circuitry in this state is fully reset and ready to initiate a fresh cycle. Similarly, reset switch 500 connects ground to capacitor 502. Further, the previous discharge of capacitor 502 or the ground applied by reset switch 500 applies a low signal of ground to pin 13 of conventional preset counter 506. Counter 506 responds by grounding each of its outputs at output pins 5, 9, 2 and 12, those outputs in turn being applied directly to conventional binary coded decimal to decimal converter 508 which produces a low output at output pin 1 and a high output at each of output pins 2 through 11 representing the decimal digits which are set forth in FIG. 7.

The output of binary coded decimal to decimal converter 508 at pin 1 is applied to the base of transistor 510 via conventional inverter 512 and resistor 514 so that when output pin 1 of converter 508 is low, transistor 510 is biased into its non-conductive condition preventing power from being applied to conventional Hall Effect switches 516 and 518 which thus are kept inoperative.

Further, the output of inverter 512 is connected via resistor 520 to the base of NPN transistor 522 keeping that transistor conductive. The low output on pin 1 is applied to pin 10 of preset counter 506 to make sure counter 506 is preset to zero.

The first cycle is begun by manual operation of transfer switch 534 after fruit has been loaded into the horizontal assembly 20. Operation of switch 534 causes a low potential to be applied as one input to gate 524 causing flip-flop 528 to change its output condition and particularly for gate 526 to shift from a high to a low output condition. The output of gate 526 is applied to pin 1 of dual monostable flip-flop 536 via transistor 522, which is now in its conductive condition as discussed above. Monostable flip-flop 536 responds by producing a pulse which is applied via diodes 538 and 540, which comprise an OR circuit, to pin 8 of counter 506 which advances its stored count by one. The output of counter 506 is decoded by converter 508 which shifts its low output on pin 1 to high and produces a low output on pin 2, with pins 3 through 11 remaining in their high output condition.

The shifting of pin 1 of converter 508 into its high output condition causes transistors 510 and 522 to return to their conductive and non-conductive conditions respectively. This causes positive voltage to be applied to Hall Effect switches 516 and 518 which are thus made operative and which apply a low signal to the monostable flip-flop 536 each time that a magnet passes one of the respective Hall Effect switches. The shifting of transistor 522 into its non-conductive condition prevents flip-flop 528 from further effecting monostable flip-flop 536. The shifting of pin 1 of converter 508 to a high output also permits counter 506 to return to a binary two output when gate 630 operates as described below.

The initial operation of reset switch 500 or resetting of the circuit by turning on the power causes a low potential to appear at the pin 1 output of converter 508 which was also applied to one of the inputs to NAND gate 550 and one of the inputs to NAND gate 592. The other inputs to gate 550 are connected to pins 6, 7 and 9 of converter 508 which are respectively associated with decimal digits 5, 6 and 7 so that the shifting of the output of converter 508 at output pin 1 to a low condition produces high outputs of gates 550 and 592 which are respectively applied to the base of transistor 552 via resistors 554 and 556 and to similar driver circuitry 593. Transistor 552 then shifts to its conductive condition, applying a high potential to the base of Darlington connected transistor 560 which likewise shifts to its conductive condition so that current flows through solenoid coil 562 which then operates hydraulic valve 336, as shown in FIG. 6, causing horizontal assembly 20, which will receive a full load of fruit to be peeled, to be moved out to the load position. Current flows through coil 594 to cause the vertical assembly to move down to its lower park position.

After manual loading of horizontal assembly 20, transfer switch 534 is manually operated to transfer the fruit automatically to vertical assembly 22. The subsequent shifting of the output pin 1 of converter 508 to its high condition in response to manual operation of transfer switch 534 after loading causes gates 550 and 592 to resume their normal low output condition which in turn causes transistors 552 and 560 to resume their non-conductive conditions, terminating the flow of current through coil 562 and cutting off the hydraulic pressure urging horizontal outward movement of horizontal assembly 20, as well as the vertical downward movement of the vertical assembly 22. This first movement is not controlled by the Hall Effect switches since they are kept inoperative by transistor 510.

The appearance of a low signal on output pin 2 of converter 508, associated with the decimal digit 1 applies a low signal as one output to NAND gate 570 which now shifts to a high output condition causing solenoid coil 572 to be activated via amplifier and driver circuitry 574, which is preferably identical to the circuitry which is connected between gate 550 and solenoid 562. Solenoid 572 is connected to hydraulic valve 362 which applies hydraulic fluid to hydraulic cylinder 60 to cause vertical assembly 22 to move upward at its fast speed until it reaches an intermediate position where the magnet mounted on the center of the vertical assembly 22 energizes the Hall Effect switch 518 to apply a pulse to monostable flip-flop 536 which in turn increments counter 506 and shifts the output of converter 508 at pin 2 from low to high and at pin 3 from high to low.

The appearance of a low output signal at pin 3 of converter 508 causes NAND gate 580 to shift its output condition from low to high, which output is applied to one input to AND gate 582. The other input to AND gate 582 is connected to the output of gate 524 in transfer flip-flop 528 which at this time has a positive output so that gate 582 shifts its output to a low condition, that condition being inverted by invertor 584 to apply a high potential to amplifying and driving circuitry 586 which in turn causes current to flow through solenoid coil 588. Solenoid coil 588 is connected to valve 336 which applies hydraulic fluid to cylinders 104 and 105 to move the horizontal assembly 20 inward.

During that inward movement, a magnet on the horizontal assembly passes Hall Effect switch 516 and applies a pulse to monostable flip-flop 536, that pulse incrementing counter 506 and causing the output of converter 508 at pin 3 to resume its high condition and the output at pin 4 to shift to low. However, since the output at pin 4 is connected as the other input to gate 580, coil 588 remains activated and the horizontal assembly continues moving inward.

When horizontal assembly 20 arrives at the transfer position, the other magnet on the horizontal assembly encounters Hall Effect switch 516, causing counter 506 to be incremented once again and pin 5 of converter 508 to shift to its low output condition while pins 3 and 4 are now in the high output condition terminating the flow of current through solenoid coil 588 and ending the movement of horizontal assembly 20 at the transfer position. The shifting of pin 5 to the low condition applies a low potential to gate 570 so that coil 572 is again activated and vertical assembly 22 once more moves upward at its fast rate until it reaches the transfer position at which time a magnet operates Hall Effect switch 518 causing counter 506 to be incremented once more and a low potential to appear at output pin 6 of convertor 508. Gate 570 now has a low output so that coil 572 is disabled and vertical upward movement of the vertical assembly halts. Each of the spikes in the vertical assembly have now impaled a fruit for peeling.

The low output at pin 6 now causes the output of gate 550 to again go high causing horizontal assembly 20 to move outward away from the impaled fruit as current flows through coil 562. Further the low output at pin 6 resets flip-flop 528 so that transfer switch 534 is now effective. A magnet on the horizontal assembly 20 next produces a pulse incrementing convertor 508 so that pin 7 is low, continuing horizontal movement and causing coil 594 to be activated by gate 592. Both assemblies are now in movement.

A magnet on vertical assembly 22 next passes Hall Effect switch 518 incrementing counter 506 and causing a low potential now to appear at output pin 9 of convertor 508 which like pin 7, is connected to gates 550 and 592 so that the downward and outward movement continues until a further pulse from flip-flop 536 cause pin 10 to go low, cutting off the flow of current through coils 562 and 594. Pin 10 is connected via invertor 600 to driver and amplifying circuitry 602 to activate coil 604 which causes the vertical assembly 22 to move up slowly. The output at pin 10 of convertor 508 is further inverted by inverter 606 to produce a signal at output line 610 which enables the circuitry which controls penetration of the cutting knife as will be explained in detail below. The high output line 603 permits the rotator slowing circuitry to be activated. During this time vertical assembly 22 is moving slowly upwardly while the impaled fruit is being peeled by the cutting assembly. When the peeling operation has been completed, the vertical assembly has reached a position where Hall Effect switch 518 encounters a magnet on vertical assembly 22 which increments counter 506, once more causing a low potential to appear at pin 11 of convertor 508 so that the circuitry associated with the cutting assemblies is disabled as line 610 again resumes a low potential and gate 570 produces a high output which causes vertical assembly 22 to move upward at the fast rate until it reaches the transfer position at which time the peeled fruit is automatically transferred to the conventional slicer or other mechanism. Pin 11 is also coupled to driver circuitry 612 via inverter 614 to cause the conventional slicer or other mechanism to move downward, as coil 611 is activated, into position to receive the peeled fruit. Line 615 is connected to the secondary processing unit so that transistor 617 is rendered non-conductive preventing vertical assembly 22 from moving into transfer position unless the secondary unit is ready to receive the fruit. When the vertical assembly 22 reaches its upper position, Hall Effect switch 518 is again activated by a magnet which increments counter 506 and causes a high at both inputs of NAND gate 616 to cause a low output to appear at the output on NAND gate 616. Gate 616 is connected to coil 620 which is driven by conventional circuitry 622 via invertor 626 in response to the detected output of NAND gate 616 to cause the slicer to move up with the peeled fruit. In this condition gate 592 also provides a positive output potential which is applied to coil 594 via driver circuit 593 to cause the vertical assembly to again move downward to the park position at which time counter 506 is automatically reset to the binary two output state in which a low output appears at pin 3 of convertor 508 while pins 1, 2 and 4 through 11 have a high output, and the above cycle can be repeated by manual operation of the transfer switch 534.

The above operations of the cycle are summarized in the following Table 1, in which the cycle is related to the schematic illustrations in FIG. 8.

TABLE 1

Cycle of Operations

| Sequence | Binary Code | Function | Figure Position In Which Sequence Ends | Initiated by |
| --- | --- | --- | --- | --- |
| 0 | 0000 | Horizontal Assembly moves out to load position<br>Vertical Assembly moves down to lower park position | 8a | Reset by starting |
| 1 | 0001 | Vertical Assembly moves upward from lower park position to intermediate position | 8b | Manual operation of transfer switch after Horizontal Assembly loaded with fruit |
| 2 | 0010 | Horizontal Assembly moves in to intermediate position | 8c | Vertical assembly middle magnet energizes Hall Effect switch 518 |
| 3 | 0011 | Horizontal Assembly continues to inward movement until transfer position | 8d | Horizontal Assembly in magnet energizes Hall Effect Switch 516 |
| 4 | 0100 | Vertical Assembly moves upward to pierce fruit | 8e | Horizontal Assembly out magnet energizes Hall Effect Switch 516 |
| 5 | 0101 | Horizontal Assembly moves out leaving fruit impaled on vertical assembly | 8f | Vertical Assembly Lower magnet energizes Hall Effect Switch 516 |
| 6 | 0110 | Vertical moves down with impaled fruit<br>Horizontal continues outward movement to load position | 8g | Horizontal Assembly in magnet energizes Hall Effect Switch 516 |
| 7 | 0111 | Vertical Assembly continues down to lower park position Horizontal continues outward | 8h | Vertical Assembly up magnet energizes Hall Effect Switch 518 |
| 8 | 1000 | Vertical comes up slow | 8i | Vertical Assembly top magnet energizes Hall Effect Switch 518 |
| 9 | 1001 | Vertical moves up fast to transfer position | 8j | Peeling Completed - Vertical Assembly middle magnet energizes Hall Effect Switch 518 |
| 10 | 1010 | Vertical moves down - | 8k | Vertical Assembly lower magnet energizes Hall Effect Switch 518 |
| 11 | 1011 | Preset to Binary 2 awaiting Transfer Switch | | Vertical Assembly middle magnet energizes |

TABLE 1-continued

Cycle of Operations

| Sequence | Binary Code | Function | Figure Position In Which Sequence Ends | Initiated by |
|---|---|---|---|---|
| | | manual operation | | Hall Effect Switch 518 |

Figure 9A:
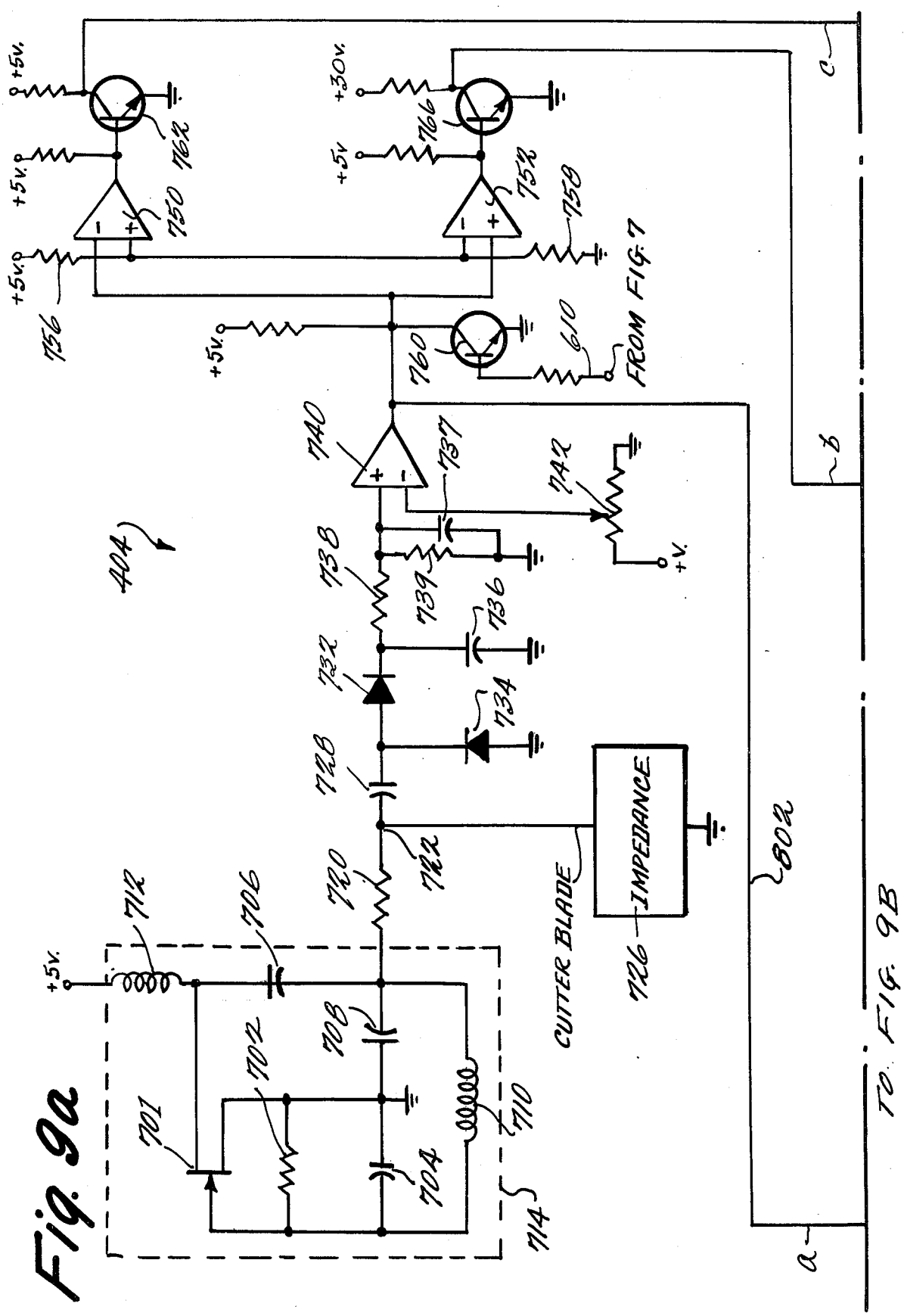
FIGS. 9a and 9b join to show a detailed schematic of the cutter logic circuitry for controlling movement of one of the cutter assemblies.
Figure 9B:
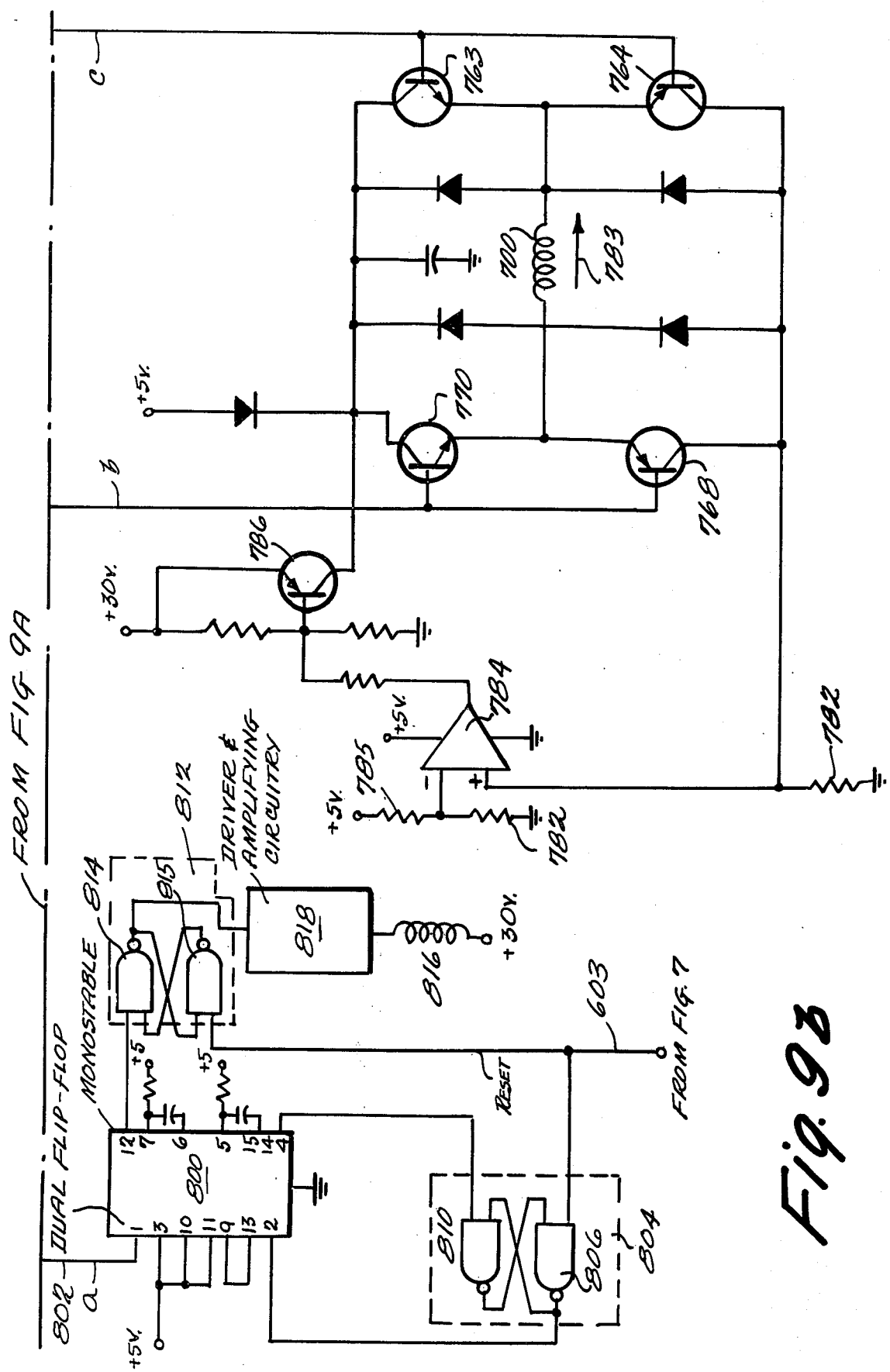

Reference is now made to FIG. 9 which illustrates the cutter logic circuitry 404 for controlling movement of one cutter blade during the cutting operation so that only the peel of the fruit is removed, and the sections are left fully undamaged. Similar circuitry controls operation of each of the cutter assemblies independently except that only one circuit for slowing rotation of the vertical assemblies during peeling is required. Field effect transistor 701, resistor 702, capacitors 704, 706 and 708, together with coils 710 and 712, comprise a conventional high frequency oscillator circuit 714 which generates a radio frequency A.C. signal at a frequency of roughly 1 Megahertz. This A.C. signal is applied via resistor 720 directly to the cutter blade so that the impedance between the cutter blade and ground, represented by the spike penetrating into the fruit, determines the potential which appears at point 722. That impedance is generally indicated in FIG. 9 as numeral 726.

The high frequency signal generated by oscillator 714 flows through capacitor 728 and rectified by diodes 734 and 732. Capacitors 737 and 736, together with resistor 738, form a filter circuit with the output thereof being applied to the positive input to conventional comparator 740. The negative input of comparator 740 is connected to a potentiometer 742 so that reference signal of any desired level can be applied thereto. This reference signal represents the voltage level applied to comparator 740 at which all of the peel has been effectively removed as indicated by the value of impedance 726, and can be set with a few simple tests.

While the cutter blade is removing the peel by alternate in and out movement, the input applied to comparator 740 at the positive input exceeds the reference signal applied by resistor 742 so that comparator 740 produces a positive output signal of, for example, five volts. This output signal is applied to the negative input to comparator 750 and to the positive input to comparator 752. The positive input of comparator 750 is connected to a positive voltage source via resistor 756 and similarly the negative input to comparator 752 is connected to the positive input of comparator 750 and to ground via resistor 758.

Transistor 760 is connected to line 610 in FIG. 7 to provide an enabling signal during the portion of the cycle in which the cutter is to be operated, so that transistor 760 shifts to its non-conductive condition permitting the output of comparator 740 to be applied to comparators 750 and 752 during the appropriate time of the cycle.

When the cutter blade makes contact with the fruit, the output of comparator 740 shifts to a ground level as the applied voltage to the positive input drops below that applied to the negative. Accordingly, the output of comparator 750 causes transistor 762 to shift into its conductive condition, rendering transistor 763 non-conductive and transistor 764 conductive. Similarly in this condition, transistor 766 is rendered non-conductive by the output of comparator 752 in turn causing transistor 768 to be non-conductive and transistor 770 to be conductive so that current flows through the valve coil 700 in the direction of arrow 782 via conductive transistors 740 and 764. Coil 700 controls movement of one of the cutter assemblies as illustrated in FIG. 6. In this direction of current flow the cutting head moves outwardly away from the fruit so that actual penetration into the edible portion of the fruit is avoided and the thin membrane which surrounds the fruit is not breached. Until the cutting edge reaches that portion, comparator 752 maintains transistor 766 non-conductive which in turn causes transistors 763 and 768 to conduct current through coil 700 in a direction opposite that indicated by arrow 783 so that the cutting blade is accordingly advanced into the fruit removing the peel as it goes.

When the current through the coil 700 changes direction the voltage across resistor 782 temporarily drops to ground. Since the voltage applied to the positive input of comparator 784 is now less than the voltage set by resistors 785 and 782 to the negative input comparator 784 provides a low potential which renders transistor 786 conductive and applies a 30 volt positive signal to the current coil 700 so that the current reversal through the coil is speeded up to combat back EMF occuring during reversal and to make sure that the cutting blade is quickly disengaged.

As discussed above, particularly in conjunction with the description of the schematic diagram of FIG. 6, the unique circuitry of this invention causes the fruit initially to be rotated at a fast speed which is slowed as the cutting blade begins to peel those portions of the fruit furtherest from the axis of rotation which are accordingly rotating at a high speed. This is accomplished by operation of the slow valve 402 in FIG. 6. More particularly referring to FIG. 9, the first encounter of the edible portion of the fruit causes comparator 740, as described above, to produce a negative signal which is applied to pin 1 of dual monostable flip-flop 800 via line 802. Flip-flop 800 responds by shifting output pin 13 high and output pin 4 low. The low output at pin 4 of flip-flop 800 changes the output state of flip-flop 804 which is comprised of gates 806 and 810.

The output of gate 806 is connected to pin 2 of flip-flop 800 so that when the output of flip-flop 804 goes low, flip-flop 800 is inhibited against response by a further signal on line 802. After a predetermined length of time, output pin 13 of flip-flop 800 shifts into a low output condition, triggering the other half of the dual flip-flop 800. This causes output pin 12 of flip-flop 800 to assume a low potential which in turn causes the output of flip-flop 812, which is comprised of gates 814 and 815, to shift into a high output condition which is applied to the solenoid coil 816 of slow valve 402 in FIG. 6 via driver and amplifying circuitry 818. Driver and amplifying circuitry 818 are preferably identical to the similar circuitry illustrated in detail in FIG. 7.

Line 603 from FIG. 7 is low, except when the assembly is moving up during peeling.

While the unique invention of this application is particularly effective in peeling citrus fruits, such as oranges and grapefruit, it may find utility for peeling other fruits as well. Detection of penetration into the edible fruit portion by applying a high frequency, A.C. signal and determining the voltage response has been found to be the most satisfactory technique, other detecting arrangements can, of course, be utilized. Many other changes and modifications of the above-described embodiment of the invention can, of course, be carried out without departing from the scope thereof. Accordingly, that scope is intended to be limited only by the scope of the appended claims.

We claim:

1. Apparatus for peeling an edible food product having a peel and an edible interior portion comprising:
   a cutting blade,
   means for moving said blade to effect cutting,
   means for holding a product for peeling,
   means for mounting said cutting blade for movement toward and away from said product,
   electrically conductive means for penetrating into said interior portion of said product,
   means for applying an AC electrical signal to said blade so that when said blade is in contact with said product current flows through said product from the blade to said conductive means producing an electrical response signal,
   means for causing movement of said mounting means and cutting blade toward and away from said product as a function of said response signal so as to remove the peel without substantially removing the interior portion.

2. Apparatus as in claim 1 wherein said product is a fruit and further including means for rotating said holding means and any fruit held thereon so as to remove said peel as a helix.

3. Apparatus as in claim 2 wherein said holding means includes spike means for penetrating into said fruit and said rotating means includes a hydraulic motor coupled to said spike means for rotating said spike means.

4. Apparatus as in claim 3 wherein said spike means includes a spike and at least a pair of tines disposed thereabout.

5. Apparatus as in claim 1 wherein said applying means includes means for applying a radio frequency A.C. signal to said cutting blade and wherein said conductive means includes a grounded portion of said holding means penetrating into said interior portion so that the voltage between said blade and ground varies as a function of the impedance between said blade and ground through said product, said impedence varying as a function of the peel removed at a given cutting point.

6. Apparatus as in claim 5 wherein said radio frequency signal applying means includes a radio frequency oscillator and means for connecting said oscillator to said cutting blade.

7. Apparatus as in claim 6 further including means for establishing a reference voltage, comparator means having said reference voltage as one input and said response signal as the other input to produce an electrical output signal indicating when said cutting means has penetrated to said edible interior portion of said fruit.

8. Apparatus as in claim 7 wherein said reference voltage establishing means includes a potentiometer and further including means for rectifying the A.C. voltage signal between said cutter blade and ground, means for filtering the rectified voltage signal and means for applying the filtered signal to said comparator.

9. Apparatus as in claim 1 further including loader means for presenting a fruit to said holding means, and means for causing movement of said loader means and holding means for transfer of fruit from said loader means to said holding means.

10. Apparatus as in claim 1 further including a frame, at least one holding means mounted on said frame for movement substantially in a first direction which intersects the direction of movement of said cutter blade, means for causing said movement of said holding means, means for loading fruit, means mounting said loading means for movement in a second direction which intersects the direction of movement of said holding means, means for causing movement of said loading means and control means for causing sequential movements of said loading means, holding means and cutting blade to transfer a fruit from said loading means to said holding means and thereafter peel said fruit.

11. Apparatus as in claim 10 including position means connecting to said control means for producing electrical signals indicating the positions of said holding and loading means.

12. Apparatus as in claim 11 wherein said position means includes a plurality of magnets mounted on said holding means and on said loading means for movement therewith and a plurality of switch means mounted on said frame, one adjacent the path of travel of said holding means and one adjacent the path of travel of said loading means for each producing an electrical signal each time a magnet passes adjacent thereto.

13. Apparatus as in claim 12 wherein each said switch means is a Hall Effect switch.

14. Apparatus as in claim 12 wherein said control means includes counter means connected to said switches for incrementing each time one of said magnets passes one of said switch means and logic means for decoding the output of said counter means to cause said movements.

15. Apparatus as in claim 14 wherein said means for causing movement of said holding means, and means for causing movement of said loading means each includes a hydraulic cylinder and a solonoid valve for controlling hydraulic fluid applied thereto and wherein said solonoid valves are connected to said logic means.

16. Apparatus as in claim 15 further including a driver and amplifier circuit connected between said logic means and each said solonoid valve.

17. Apparatus as in claim 14 wherein said counter means includes a monostable flip-flop with an input connected to said switch means, a preset counter connected with an input connected to the output of said flip-flop and a binary to binary coded decimal converter with an input connected to the output of said preset counter.

18. Apparatus as in claim 17 including electronic switching means connecting a source of power to said switch means and connected to said converter for disabling said switch means when said converter is in a reset state.

19. Apparatus as in claim 14 wherein said counter means has states as set forth in Table 1 of the specification and said control means controls said movement as set forth in said Table 1.

20. Apparatus as in claim 1 further including means for rotating said holding means and means for moving said holding means during peeling along a tilted, substantially vertical path in which the cutting blade first encounters the upper surface of the fruit which tilts away from the cutting blade as the fruit moves upward.

21. Apparatus as in claim 20 including further means for causing said holding means to rotate slowly, and means responsive to the first electrical signal produced by contact with said interior portion for enabling said further means after a given time delay.

22. Apparatus as in claim 1 further including:
a frame,
a plurality of cutting blades,
said mounting means including a plurality of cutting assemblies each mounting one of said cutting blades,
said causing means including means for moving each of said cutting assemblies toward and away from a fruit to be peeled,
a plurality of said fruit holding assemblies,
means for mounting said fruit holding assemblies for substantially vertical movement,
means for moving said fruit holding assemblies and mounting means,
a loading assembly having a plurality of fruit gripping means,
means for mounting said loading assembly for substantially horizontal movement, and
means for moving said loading assembly.

23. Apparatus as in claim 22 wherein said fruit holding assemblies each include a grounded spike and at least a pair of tines flanking said spike for preventing a fruit impaled on said spike from slipping during rotation and a hydraulic motor coupled to said spike for rotating the same and wherein said fruit holding assemblies mounting means includes a bar on which said fruit holding assemblies are mounted and wherein said fruit holding assembly moving means includes a hydraulic cylinder connected between said frame and said bar for raising and lowering said bar and the fruit holding assemblies mounted thereon.

24. Apparatus as in claim 23 wherein said fruit holding assemblies moving means includes means for causing said bar and fruit holding assemblies to tilt away from said cutting assemblies as said bar and fruit holding assemblies are moved upward.

25. Apparatus as in claim 24 wherein said tilt causing means includes a cam plate and a cam follower connected between said plate for following the contour thereof to tilt said bar.

26. Apparatus as in claim 22 wherein said cutting assemblies each include a conical cutter blade, and a hydraulic motor connected to said blade for rotating said blade and wherein said cutting assembly moving means includes an hydraulic cylinder connected between said frame and cutting assembly for advancing and retreating said cutter assembly.

27. An apparatus as in claim 22 wherein said loading assembly includes a bracket member, a plurality of fruit gripping members mounted on said bracket member to extend below said bracket member, wherein said loading assembly mounting means includes two sets of shafts each mounted on said frame and engaging said bracket member at opposite ends of said bracket member for guiding horizontal movement and wherein said loading assembly moving means includes at least one hydraulic cylinder mounted between said frame and bracket member adjacent one end of said bracket member.

28. Apparatus as in claim 27 wherein said loading assembly moving means includes a second hydraulic cylinder mounted between said frame and bracket member at the other end of said bracket member.

29. Apparatus as in claim 27 further including means for supplying hydraulic fluid to said cylinder, and an electrically controlable valve connected between said supplying means and said cylinder.

30. Apparatus as in claim 29 further including circuit means for controling movement of said assemblies connected to said controlable valve for controling flow of hydraulic fluid.

31. Apparatus as in claim 27 further including a plurality of lamps each mounted above one of said fruit gripping members for producing a light beam which impinges on a fruit in said gripping member so that the bud axis can be aligned with respect to the light beam.

32. Apparatus as in claim 22 further including a plurality of first magnets mounted for movement with said fruit holding assemblies a, magnetically responsive switch mounted adjacent the path of travel of said first magnets, a plurality of second magnets mounted for movement with said loading assembly, a further magnetically responsive switch mounted adjacent the path of travel of said second magnets, and control logic circuit means connected to said switches for controlling movement of said loading and holding assemblies as a function of the signals received from said switches.

33. Apparatus as in claim 22 wherein each said fruit holding assembly includes means for rotating a held fruit and further including means for slowing the rate of rotation after the initial peel portions have been removed.

34. Apparatus as in claim 33 wherein said applying means includes a radio frequency oscillator.

35. Apparatus as in claim 22 wherein each said cutting assembly includes a cutter blade, and further including means for applying an electrical signal to said blade so that voltage is established at said blade which indicates when the blade penetrates into the edible portion of the fruit, and circuit means for controling movement of each cutter assembly as a function of the voltage established in the blade of that cutter assembly as it cuts into a fruit.

36. Apparatus as in claim 1 wherein said AC signal has a frequency of about 1 Megahertz.

37. Apparatus for peeling fruit having a peel and an edible interior portion comprising:
means for inserting a conductive member into said interior portion,
means for cutting into the fruit to a variable depth,
means for detecting the electrical impedence of the fruit between the point of cutting and said conductive member and producing an electrical control signal as a function thereof and
means for controlling the depth of cutting as a function of said control signal.

38. A fruit peeling apparatus comprising:
a frame,
a plurality of fruit holding assemblies,
means for mounting said fruit holding assemblies for substantially vertical movement, first means for moving said mounting means and fruit holding assemblies, a loading assembly having a plurality of fruit gripping means and a bracket member mounting said fruit gripping means, means for mounting said loading assembly for substantially horizontal movement, including two sets of shafts each mounted on said frame and engaging said bracket member at opposite ends thereof for guiding horizontal movement, second means for moving said loading assembly, including at least one hydraulic cylinder mounted between said frame and bracket member adjacent one end of said bracket member, a plurality of cutting assemblies, and third means for moving each of said cutting assemblies individually toward and away one of the fruits held by one of said fruit holding assemblies to remove the peel thereon.

39. Apparatus as in claim 38 wherein said fruit holding assemblies each includes a grounded spike and at least a pair of tines flanking said spike for preventing a fruit impaled on said spike from slipping during rotation and a hydraulic motor coupled to said spike for rotating the same and wherein said fruit holding assemblies mounting means includes a bar on which said fruit holding assemblies are mounted and wherein said first means includes a hydraulic cylinder connected between said frame and said bar for raising and lowering said bar and the fruit holding assemblies mounted thereon.

40. Apparatus as in claim 39 wherein said fruit holding assemblies moving means includes means for causing said bar and fruit holding assemblies to tilt away from said cutting assemblies as said bar and fruit holding assemblies are moved upward.

41. Apparatus as in claim 40 wherein said tilt causing means includes a cam plate and a cam follower connected between said plate for the contour thereof and said bar.

42. Apparatus as in claim 38 wherein said cutting assemblies each include a conical cutter blade, and a hydraulic motor connected to said blade for rotating said blade and wherein said third means includes an hydraulic cylinder connected between said frame and each said cutting assembly for advancing and retreating said cutter assembly.

43. Apparatus as in claim 38 wherein said loading assembly moving means includes a second hydraulic cylinder mounted between said frame and bracket member at the other end of said bracket member.

44. Apparatus as in claim 43 further including means for supplying hydraulic fluid to said cylinder, and an electrically controlable valve connected between said supplying means and said cylinder.

45. Apparatus as in claim 44 further including circuit means for controlling movement of said assemblies connected to said controlable valve for controlling flow of hydraulic fluid.

46. Apparatus as in claim 38 further including a plurality of lamps each mounted above one of said fruit gripping members for producing a light beam which impinges on a fruit in said gripping member so that the bud axis can be aligned with respect to the light beam.

47. Apparatus as in claim 38 further including a plurality of first magnets mounted for movement with said fruit holding assemblies, a magnetically responsive switch mounted adjacent the path of travel of said first magnets, a plurality of second magnets mounted for movement with said loading assembly, a further magnetically responsive switch mounted agjacent the path of travel of said second magnets, and control logic circuit means connected to said switches for controling movement of said assemblies as a function of the signals received from said switches.

48. Apparatus as in claim 38 wherein each said fruit holding assembly includes means for rotating a held fruit and further including means for slowing the rate of rotation after the initial peel portions have been removed.

49. Apparatus as in claim 38 wherein each said cutting assembly includes a cutter blade, and further including means for applying an electrical signal to said blade so that a voltage is established at said blade which indicates when the blade penetrates into the edible portion of the fruit, and circuit means for controlling movement of each cutting assembly as a function of the voltage established at the blade of that cutting assembly as it cuts into a fruit.

50. Apparatus as in claim 49 wherein said applying means includes a radio frequency oscillator.

51. A fruit peeling apparatus comprising:

a plurality of first assemblies for holding at least one fruit to be peeled, means for moving said first assembly back and forth in a first direction, a second assembly for presenting fruit to each one of said first assemblies to be transferred thereto, means for moving said second assembly back and forth in a second direction, a plurality of cutter assemblies, means for moving said cutter assembly toward and away from said fruit to remove the peel, means for detecting the positions of said first and second assemblies and producing an electrical signal, control circuit for causing movement of said first, second and cutter assemblies responsive to said electrical signal in a cycle in which said fruit is first transferred from said second to said first assembly and then peeled by said cutter assembly, a plurality of first magnets mounted for movement with said first assemblies, magnetically responsive switch means mounted adjacent the path of travel of said first magnets, a plurality of second magnets mounted for movement with said second assembly, a further magnetically responsive switch mounted adjacent the path of travel of said second magnets, and means connecting said control circuit to said switch means for controlling movement of said assemblies as a function of the signals received from said switches.

52. An apparatus as in claim 51 further including a frame and wherein said second assembly includes a bracket member, a plurality of fruit gripping members mounted on said bracket to extend below said bracket, wherein said second assembly moving means includes two sets of shafts each mounted on said frame and engaging said bracket member at opposite ends of said bracket member for guiding horizontal movement and at least one hydraulic cylinder mounted between said frame and bracket member adjacent one end of said bracket member.

53. Apparatus as in claim 52 wherein said second assembly moving means includes a second hydraulic cylinder mounted between said frame and bracket member at the other end of said bracket member.

54. Apparatus as in claim 51 further including a frame and wherein said first assemblies each includes a grounded spike and at least a pair of tines flanking said spike for preventing a fruit impaled on said spike from slipping during rotation and to said spike for rotating the same and wherein said first assemblies moving means includes a bar on which said first assemblies are mounted and a hydraulic cylinder connected between said frame and said bar for raising and lowering said bar and the first assemblies mounted thereon.

55. Apparatus as in claim 54 wherein said first assemblies moving means include means for causing said bar and first assemblies to tilt away from said cutting assemblies as said bar and first assemblies are moved upward.

56. Apparatus as in claim 55 wherein said tilt causing means includes a cam plate and a cam follower connected between said plate for the contour thereof and said bar.

57. Apparatus as in claim 54 further including means for supplying hydraulic fluid to said cylinder, and an electrically controlable valve connected between said supplying means and said cylinder.

58. Apparatus as in claim 54 further including circuit means for controlling movement of said assemblies connected to said controlable valve for controling flow of hydraulic fluid.

59. Apparatus as in claim 51 further including a plurality of lamps each mounted above said second assembly for producing a light beam which impinges on a fruit held by said second assembly so that the bud axis can be aligned with respect to the light beam.

60. Apparatus as in claim 51 wherein each said cutter assembly includes a cutter blade, and further including means for applying an electrical signal to said blade so that voltage is established at said blade which indicates when the blade penetrates into the edible portion of the fruit, and wherein said control circuit includes means for controlling movement of each cutter assembly as a function of the voltage established at the blade of that cutter assembly as it cuts into a fruit.

61. Apparatus as in claim 60 wherein said applying means includes a radio frequency oscillator.

62. Apparatus as in claim 51 wherein each said first assembly includes means for rotating a held fruit and further including means for slowing the rate of rotation after the initial peel portions have been removed.

63. Apparatus as in claim 51 further including a frame and wherein said cutter assemblies each include a conical cutter blade, and a hydraulic motor connected to said blade for rotating said blade and wherein said cutter assembly moving means includes an hydraulic cylinder connected between said frame and cutter assembly for advancing and retreating said cutter assembly.

* * * * *